M. C. McCOY.
NUT LOCK.
APPLICATION FILED JULY 23, 1908.
910,712.
Patented Jan. 26, 1909.
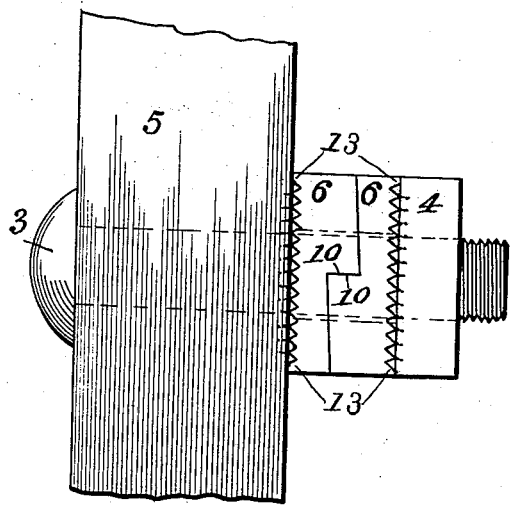
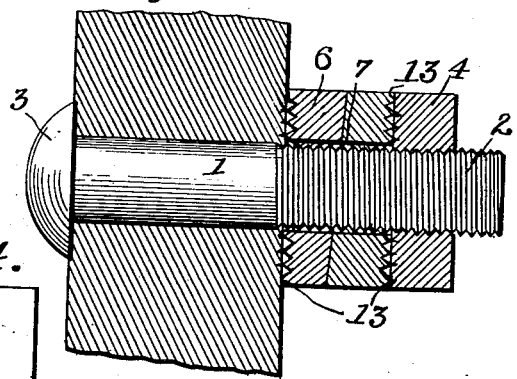
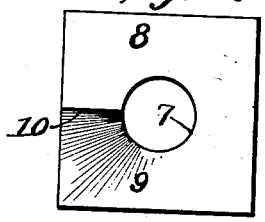
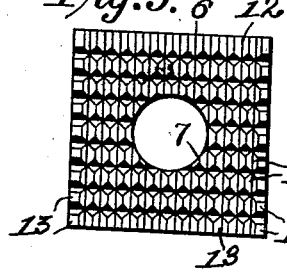
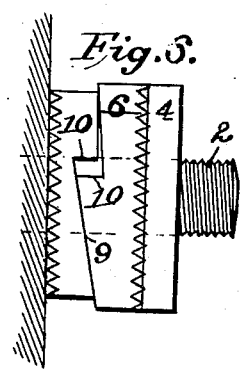
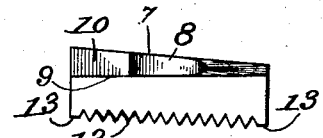
Mason C. McCoy, Inventor
Witnesses
J. T. Walker,
Irv. L. McCathran.
By E. E. Vrooman,
his Attorney

UNITED STATES PATENT OFFICE.

MASON C. McCOY, OF WALLA WALLA, WASHINGTON.

NUT-LOCK.

No. 910,712.　　　Specification of Letters Patent.　　　Patented Jan. 26, 1909.

Application filed July 23, 1908. Serial No. 444,959.

*To all whom it may concern:*

Be it known that I, MASON C. McCOY, citizen of the United States, residing at Walla Walla, in the county of Walla Walla and State of Washington, have invented certain new and useful Improvements in Nut-Locks, of which the following is a specification, reference being had therein to the accompanying drawing.

This invention relates to improvements in nut locks, and has for its object the provision of means for facilitating the securing of a nut upon a bolt against accidental displacement.

Another object of the invention is the peculiar construction of a sectional washer, which is provided with means for gripping or biting a nut and also the support carrying the bolt, upon which the nut is supported; the washer preventing the nut from being accidentally displaced or moved off of the bolt, although the nut can be removed, by the operator, without materially injuring or marring the washer.

A further object of the invention is the construction of a nut lock, which comprises a minimum number of parts, is comparatively simple and inexpensive to manufacture, and efficient and durable in operation.

With these and other objects in view, the invention consists of certain novel construction combinations, and arrangements of parts, as will be hereinafter fully described and claimed.

In the drawings: Figure 1 is a view, in side elevation, of a device constructed in accordance with the present invention. Fig. 2 is a longitudinal, sectional view of the device illustrated in Fig. 1. Fig. 3 is plan view of the toothed face of one of the sections of the washer, and Fig. 4 is a plan view of the cam face of one of the sections. Fig. 5 is a view, in side elevation, of one of the sections of the washer. Fig. 6 is a view, in side elevation, showing the position assumed by the sections of the washer when the nut is turned slightly, or accidentally moved upon the bolt; the sections of the washer clamping the support and nut and holding said nut from displacement off of the bolt.

Referring to the drawings by numerals, 1 designates a shank of the bolt, which is provided with a threaded end 2, and with a head 3 at one end. A nut 4 is threaded upon the bolt and between the nut and the support 5, is positioned a washer, comprising a pair of similarly-constructed sections 6. Each section of the washer is provided with a central aperture or bore 7, which is, preferably, larger than the threaded portion 2 of the bolt, so that the sections can be quickly assembled upon the bolt. Each section is provided with an inner cam-face 8, and said face is inclined, at 9, terminating in a vertical shoulder 10, so that when the inner faces of the two sections of the washer are placed together, the two shoulders 10 will be positioned parallel, as shown in Fig. 1, preventing one section from rotating in one direction independently upon the other section of said washer.

In Fig. 6, I have shown how the sections may be slightly separated, causing one of the sections to ride up the inclined face of the other section, thereby forcing the outer toothed face of one section against the nut and the toothed face of the other section against the support or member carrying the bolt, thereby jamming the nut and support apart, producing a secure lock between said nut and support, whereby the nut can not be accidentally rotated off of the bolt with respect to the support.

The toothed or biting face of each section of the washer is formed by a plurality of parallel rows of teeth extending entirely across the face of the section; each tooth being provided with a sharp biting or cutting edge throughout its entire length, and the inner teeth 11 are of less length than the outer sharpened teeth 12. At two edges, of the face, there are formed parallel rows of short teeth or lugs 13, which are provided with flat outer faces constituting stops whereby the intermediate teeth 11 and 12 can not be injured by the forcing of the washer too hard against the support or the nut against the washer, for while the teeth will enter the support and washer a sufficient distance to prevent accidental displacement, or the nut working off from the bolt, still, by the operator employing a suitable tool, as for instance, a wrench, the nut can be removed off of the bolt and, consequently, from in engagement with the washer, without materially injuring the teeth, as would be the case if no means was provided for limiting the depth which the teeth were permitted to enter the support or the bolt; the teeth 11 and 13 extend slightly above the flat ends of the auxiliary teeth or lugs 13, for permitting the gripping or biting action of the washer.

It is to be noted that the forming of the teeth on the toothed face of each section can be quickly and inexpensively done, as a sharp file can be used for producing the teeth having the cutting edges, and then some of the outer rows of teeth, can be flattened by laying a file flat upon the sharpened teeth and filing the same sufficiently to form the flat ends. Therefore, it will be seen that I have provided on each washer, a series of parallel rows of teeth having cutting or sharpened edges and a plurality of rows of blunt or unsharpened teeth or stops of less height than the sharpened teeth for limiting the cutting or biting action of the washer relative to the member engaging the same.

My nut lock is susceptible of being used in many places, as for instance, upon machinery in which the vibration of the mechanism would cause an ordinary nut to work off of the bolt or in a stationary engine of any kind, as well as on railroad tracks and the like. It will also be noted that when removing the nut, a wrench should be employed to hold the outer half of the washer stationary, because when the outer section of the washer has play, it works upon the inclined face forming the cam, as hereinbefore stated, thus forcing each toothed face of the washer into the surface against which it rests, thereby holding the nut against accidental displacement or working off under normal conditions.

What I claim is:

1. In a nut lock, the combination with a bolt, of a sectional washer positioned upon said bolt, a nut threaded upon said bolt, said sections of the washer provided with engaging cam-surfaces, each section provided with an outer toothed face, the nut engaging one of the toothed faces, each toothed face comprising a plurality of rows of sharpened teeth with a plurality of rows of teeth having flat or blunt edges positioned outside of the rows of sharpened teeth.

2. In a nut lock, the combination with a bolt, a nut threaded thereon and a washer in engagement with said bolt, said washer provided with toothed faces upon opposite sides, each toothed face provided with a sharpened tooth adapted to enter a surface engaging the same, and each toothed face provided with a stop for preventing or limiting the tooth from entering the engaged surface too far.

3. The combination with a support and a bolt carried thereby, a nut threaded upon said bolt, of a washer positioned between the nut and support, said washer comprising a pair of sections provided with interlocking faces and each section provided with an outer toothed face, each toothed face provided with a pair of teeth having blunt portions or ends and a sharpened tooth positioned between said first-mentioned teeth, said sharpened tooth having its outer cutting edge positioned in plane outside of the horizontal plane in which the blunt ends of the first-mentioned teeth are formed.

In testimony whereof I hereunto affix my signature in presence of two witnesses.

MASON C. McCOY.

Witnesses:
  GEORGE W. THOMPSON,
  GEO. L. THOMPSON.